(12) United States Patent
Katayama et al.

(10) Patent No.: US 6,750,836 B1
(45) Date of Patent: Jun. 15, 2004

(54) LIQUID CRYSTAL PANEL AND MANUFACTURING METHOD FOR THE SAME

(75) Inventors: Shigenori Katayama, Chino (JP); Ryo Ishii, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/554,130

(22) PCT Filed: Sep. 8, 1999

(86) PCT No.: PCT/JP99/04891

§ 371 (c)(1),
(2), (4) Date: May 9, 2000

(87) PCT Pub. No.: WO00/16153

PCT Pub. Date: Mar. 23, 2000

(30) Foreign Application Priority Data

Sep. 10, 1998 (JP) ............................................ 10-257290

(51) Int. Cl.$^7$ .......................... G09G 3/18; G02F 1/1333
(52) U.S. Cl. .............................. 345/92; 345/90; 345/98; 345/204; 349/110; 349/113
(58) Field of Search .......................... 345/87–103, 204; 349/113–115, 110, 111

(56) References Cited

U.S. PATENT DOCUMENTS

| | | | | |
|---|---|---|---|---|
| 5,408,345 A | * | 4/1995 | Mitsui et al. | 359/59 |
| 5,526,149 A | * | 6/1996 | Kanbe et al. | 359/70 |
| 5,600,344 A | * | 2/1997 | Sono et al. | 345/87 |
| 5,724,111 A | * | 3/1998 | Mizobata et al. | 349/113 |
| 5,945,972 A | * | 8/1999 | Okumura et al. | 345/98 |
| 6,096,582 A | * | 8/2000 | Inoue et al. | 4381/149 |
| 6,157,429 A | * | 12/2000 | Miyawaki et al. | 349/138 |
| 6,262,783 B1 | * | 7/2001 | Tsuda et al. | 349/113 |

FOREIGN PATENT DOCUMENTS

| | | | | |
|---|---|---|---|---|
| JP | 57-66472 | | 4/1982 | |
| JP | 57-066472 | * | 4/1982 | G09F/9/35 |
| JP | 10-211293 | | 8/1998 | |

* cited by examiner

Primary Examiner—Lun-Yi Lao
(74) Attorney, Agent, or Firm—Oliff & Berridge, PLC

(57) ABSTRACT

The invention provides a liquid crystal panel substrate having transistors and reflectors connected to the transistors on a substrate to allow bright reflection display of high quality at wide viewing angles by providing the most suitable reflection characteristics to the reflectors. Under the reflectors, first conductive layers are overlaid in regions corresponding to the reflectors and formed in a concave-convex condition by forming a large number of openings. Also, in a plan view, a light-shielding film covering gaps between the reflectors is formed of the second conductive layer, and may have no openings.

17 Claims, 11 Drawing Sheets

LIQUID CRYSTAL PANEL AND MANUFACTURING METHOD FOR THE SAME

BACKGROUND OF THE INVENTION

1. Field of the Invention

The present invention relates to a technical field of a structure of a reflector-side liquid crystal panel substrate that constitutes a reflective liquid crystal panel; a liquid-crystal panel configured using the liquid crystal panel substrate; electronic equipment configured using the liquid crystal panel; and a manufacturing method for the liquid crystal panel substrate.

2. Description of Related Art

Recently, liquid-crystal panels are used as information display devices of portable apparatuses, such as portable telephones and portable information terminals. Contents of information displayed have been changed from characters and the like to a large amount of information displayed at a time. Therefore, liquid-crystal panels of a dot-matrix type are now used, and the number of pixels is proportionally increasing, thereby requiring higher duty. For these portable apparatuses, a passive-matrix liquid-crystal panel has been used. In the passive-matrix liquid-crystal panel, however, when multiplex driving is performed, selecting signals over line-scanning lines turn to be at a high duty, and a proportionally high voltage is required. This arises problems for battery-driven portable devices for which reduction in power consumption is increasingly demanded.

Under these circumstances, with Japanese Patent Application No. 10-211293, the applicant for the patent has proposed a statically-driven reflective liquid crystal panel that uses a liquid crystal panel made of a semiconductor substrate on which a memory circuit is arranged for each pixel so that display and control are performed according to data preserved in the memory circuit. This reflective liquid crystal panel does not require backlights as a light source because display is shown using light from outside reflecting, thereby allowing reduction in power consumption and allowing to be thin and light.

The reflective liquid crystal panel and the electronic equipment using the panel have well-balanced characteristics required for a display such as that contrast is high, response speeds are relatively high, driving voltage is low, and gray scale display can be easily performed. On the other hand, however, problems still remain unsolved in areas such as that theoretical viewing angles are ranged narrow, and the panel is not as yet suitable to presentation of sufficiently bright displays.

SUMMARY OF THE INVENTION

The present invention is proposed in view of the above problems. Accordingly, an object of the invention is to provide a reflective liquid crystal panel substrate that is capable of realizing high-quality reflective displays that provide a wide range of viewing angles and high brightness, a liquid crystal panel using the liquid crystal panel substrate, electronic equipment using the liquid crystal panel, and a manufacturing method for the liquid crystal panel substrate.

In order to solve the above described problems, a liquid crystal panel of the present invention may include, on a substrate, transistors, a light-shielding film connected to the transistors, reflectors connected to the light-shielding film, and a concave-convex film formed in a concave-convex condition and overlaid in regions corresponding to the reflectors via interlayer insulation films under the reflectors.

According to the liquid crystal panel substrate, corresponding to the concave-convex condition of the concave-convex film, surfaces of the reflectors (i.e., reflective surfaces) formed thereabove via the interlayer insulation films are also formed in a concave-convex condition. By this, corresponding to the level of the concave-convex condition, the scattering rate of reflecting light can be increased. As a result, with a reflective liquid crystal apparatus of a direct-view type which is formed using the reflective liquid crystal panel substrate, bright reflection display of high quality on a natural base screen having wide viewing angles can be presented according to reflectors having the most suitable reflecting characteristics that are capable of increasing the luminous intensity of light scattering in a direction perpendicular to a display screen for light that will be incident on at any angle.

In a first mode of the liquid crystal panel substrate of the present invention, as viewed in a direction perpendicular to the substrate, the light-shielding film shields light for gaps between the reflectors, and is formed of the film identical to the concave-convex film.

According to this mode, the concave-convex film is formed of, for example, an Al film, and a light-shielding film identical thereto for shielding light for the gaps between the reflectors is formed. Therefore, with transistors arranged under the reflectors and the concave-convex film, the light-shielding film shields light which will be incident via the gaps between the reflectors, thereby allowing prevention from a condition where the abovementioned light intrudes into semiconductor layers constituting the transistors to cause light leakage. Also, by forming both the concave-convex film and the light-shielding film from the same film, an unnecessary increase in the number of layers required for the overlay structure can be avoided, thereby allowing simplification in configuration and manufacturing processing for the liquid crystal panel substrate. For reference, even with a transparent concave-convex film, as long as it is formed in a concave-convex condition, since it maintains a basic function of providing a concave-convex condition to the reflectors, advantages in increasing the scattering rate of reflecting light according to the reflectors of the present invention can be obtained.

In another mode of the liquid crystal panel substrate of the present invention, the described conductive film is formed of a first conductive film, and wiring formed of the same film as the first conductive film are provided.

According to this mode, the described concave-convex film is formed of, for example, a film such as the Al film, and, for example, wiring such as interchange wiring for connecting the reflectors and transistors are formed of the first conductive film. That is, by forming both the concave-convex film and the wiring from the same film, an unnecessary increase in the number of layers required for the overlay structure can be avoided, thereby allowing simplification in configuration and manufacturing processing for the liquid crystal panel substrate. For reference, even with a transparent concave-convex film, as long as it is formed in a concave-convex condition, since it maintains a basic function of providing a concave-convex condition to the reflectors, advantages in increasing the scattering rate of reflecting light according to the reflectors of the present invention can be obtained.

In this mode, a configuration may be such that a different conductive film is further overlaid between the first conductive film and the substrate, wherein indented portions are created on the described concave-convex film formed of a portion of the first conductive film positioned above the different conductive film depending on existence of the different conductive film.

According to this configuration, compared to, for example, the case of a concave-convex film having through-holes simply formed on a planar film as concave sections, in which only two levels occur on a surface thereof; depending on existence of the different film positioned under the concave-convex film, three or more levels can occur on a surface of the concave-convex film. This allows an increase in the scattering rate of reflecting light. In this case, for the different conductive film, patterning may be positively performed so that small indented portions are created over the entire surface of the concave-convex film. Alternatively, patterns such as those of wiring formed of the different conductive film may be used as they are so that indented portions are created.

In another mode of the liquid crystal panel substrate of the present invention, the concave-convex film is formed in the concave-convex condition in a manner that a large number of very small openings are irregularly formed on a planar film.

In this mode, when the openings are formed by etching, the concave-convex film can be formed after the planar film is formed. Therefore, the concave-convex film can be formed in a relatively easy manner. Particularly, to form the wiring and the light-shielding film from the film identical to the described conductive film, the openings can be formed in the same stage as for patterning the wiring and the light-shielding film by photolithographic processing and etching. This produces advantages in simplification of manufacturing processing.

Instead of the openings, the above configuration allows forming of very small protruded sections, thereby forming concave-convex sections, that is, forming convex sections, not the concave sections, so as to form a concave-convex sections. In this case as well, to form the wiring and the light-shielding film from the film identical to the described conductive film, the openings can be formed in the same stage as for patterning the wiring and the light-shielding film by photolithographic processing and etching. This produces advantages in simplification of manufacturing processing.

In another mode of the liquid crystal panel substrate of the present invention, the substrate may be made of a semiconductor substrate.

According to this mode, transistors for switching and controlling the reflectors may be formed on the substrate.

In this mode, the substrate may be formed of a monocrystal silicon material.

In another mode of the liquid crystal panel substrate of the present invention, the substrate is made of a transparent substrate.

According to this mode, the concave-convex film overlaid via a SOG film can be used so as to form surfaces of the reflectors to be in a concave-convex condition, and also, transistors can be formed on the SOG film by use of a SOG technique.

In this mode, the substrate may be formed of glass.

In another mode of the liquid crystal panel substrate of the present invention, the interlayer insulation films include a SOG (silicon on glass) film.

According to this mode, the concave-convex film overlaid via a SOG film can be used so as to form surfaces of the reflectors to be in a concave-convex condition, and also, transistors can be formed on the SOG film by use of a SOG technique.

In this mode, the abovementioned SOG film is subjected to etchback processing.

When the SOG film is subjected to etchback processing, even better reflection characteristics can be provided to the reflectors formed thereabove.

In order to solve the problems described above, the liquid crystal panel of the described present invention may have the liquid crystal sandwiched between the liquid crystal panel substrate and a transparent opposed substrate.

According to the liquid crystal panel of the present invention, since the liquid crystal panel substrate of the described invention is included, with a reflective liquid crystal apparatus of a direct view type formed using the liquid crystal panel, bright reflection display of high quality on a natural base screen having wide viewing angles can be presented according to the reflectors having the most suitable reflection characteristics.

In order to solve the problems described above, the electronic equipment according to the present invention include the liquid crystal panel according to the described invention.

According to the electronic equipment of the present invention, since the liquid crystal panel of the invention is included, according to a reflective liquid crystal apparatus of a direct view type formed using the liquid crystal panel, bright reflection display of high quality on a natural base screen having wide viewing angles can be presented.

In order to solve the above-described problems, a manufacturing method for the liquid crystal panel substrate of the present invention which has multiple scanning lines and data lines, transistors connected to the scanning lines and the data lines, and reflectors connected to the transistors on a substrate may include a step for forming a concave-convex film in a concave-convex condition in regions that will correspond to the reflectors on the substrate, and a step for forming the reflectors via interlayer insulation films on the substrate.

According to this manufacturing method for the liquid crystal panel substrate of the present invention, the concave-convex film in the concave-convex condition is first formed in the regions that will correspond to the reflectors on the substrate. By forming very small openings by etching after the planar film is formed, for example, this step can be performed in a relatively easy manner. Subsequently, the reflectors are formed on the concave-convex film via the interlayer insulation films. Accordingly, the liquid crystal panel substrate of the described invention can be manufactured in a relatively easy manner and with high reproducibility.

The liquid crystal panel substrate of the present invention may include multiple line-scanning lines and multiple column-scanning lines that intersect with each other, multiple data lines arranged the column-scanning lines, voltage signal lines for feeding voltage signals, and multiple pixel-driving circuits arranged corresponding to intersections of the line-scanning lines and the column-scanning lines on a substrate; wherein the pixel-driving circuits have pixel electrodes, switching circuits that turn to be conductive when the line-scanning lines are selected and turn to be nonconductive when at least one of the line-scanning lines and the column-scanning lines is not selected, memory circuits for receiving data signals from the data lines when the switching circuits are conductive and for preserving the data signals when the switching circuits are nonconductive, pixel drivers for outputting first voltage signals from the voltage signal lines to the pixel electrodes when the data signals preserved in the memory circuits are at a first level and for outputting second voltage signals from the voltage signal lines to the pixel electrodes when the data signals preserved in the memory circuits are at a second level, the pixel drivers being connected to reflectors via a light-shielding film, and a concave-convex film overlaid in regions corresponding to the light-shielding film via interlayer insulation films under the reflectors, and formed of the film identical to the light-shielding film formed in a concave-convex condition.

According to the configuration of the present invention, since the reflectors are connected to the pixel drivers via the light-shielding film, the reflectors can be provided to shield light so that the pixel drivers do not cause light leakage that may occur in a condition where light that is incident intrudes into pixel drivers in a region corresponding to the gap between the reflectors. In addition, the concave-convex film is formed of the same film as the light-shielding film in the region corresponding to the reflectors, and corresponding to the concave-convex condition of the concave-convex film, surfaces of the reflectors (i.e., reflective surfaces) formed thereabove via the interlayer insulation films are also formed in a concave-convex condition. By this, corresponding to the level of the concave-convex condition, the scattering rate of reflecting light can be increased. As a result, with a reflective liquid crystal apparatus of a direct-view type which is formed using the reflective liquid crystal panel substrate, bright reflection display of high quality on a natural base screen having wide viewing angles can be presented according to reflectors having the most suitable reflecting characteristics that are capable of increasing the luminous intensity of light scattering in a direction perpendicular to a display screen for light that will be incident on at any angle.

These operational effects and other features and advantages of the present invention will become apparent from the following description of the preferred embodiments.

DESCRIPTION OF THE PREFERRED EMBODIMENTS

Hereinbelow, referring to drawings, a description will be given of preferred embodiments of the present invention.

Figure 1:
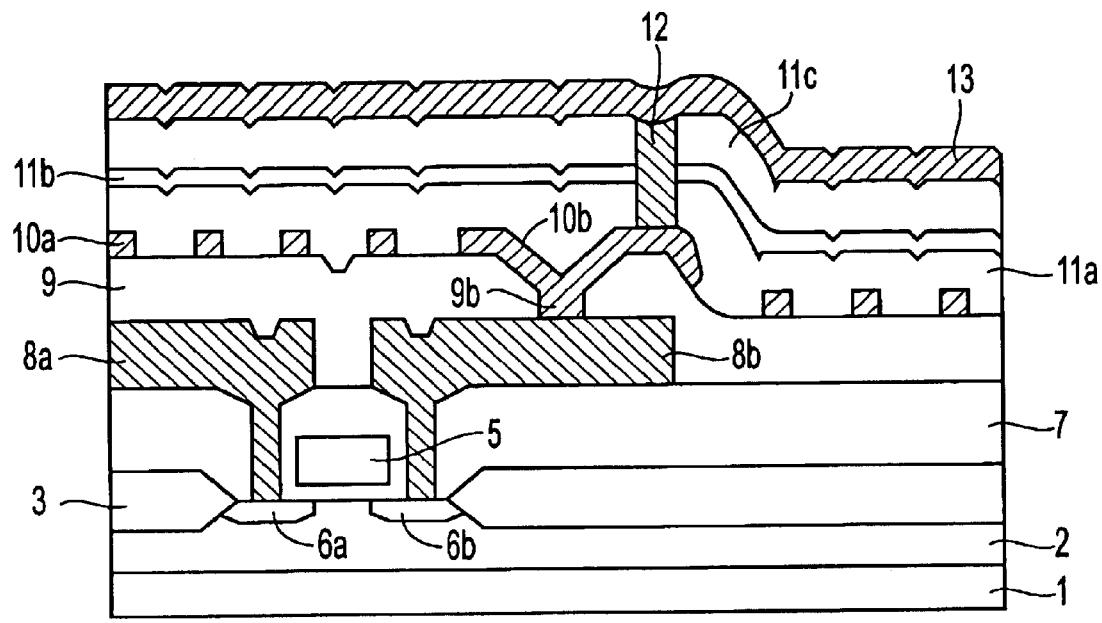
FIG. 1 is a cross-sectional view of pixel regions of a first embodiment of a reflector-side liquid crystal panel substrate that constitutes a reflective liquid crystal panel to which the present invention is applied.
Figure 5A:
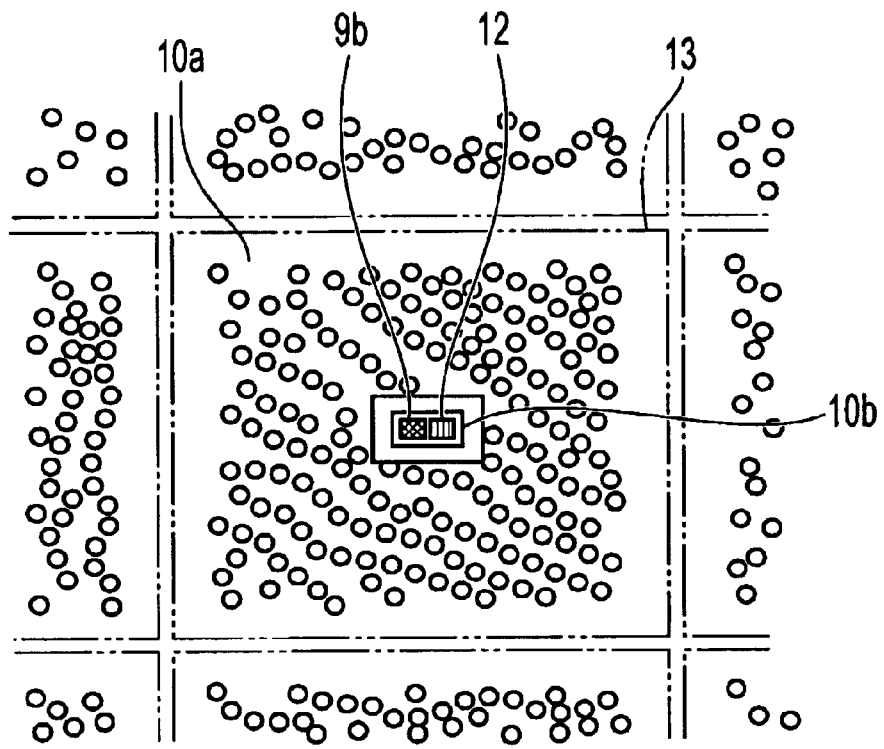
FIGS. 5(a) and 5(b) show a plan view (FIG. 5(a)) of arrangements of concave sections and a light-shielding layer in the pixel regions of the first, second, and fourth embodiments, and also shows an enlarged plan view (FIG. 5(b)) of reflector-side gap sections thereof.
Figure 5B:
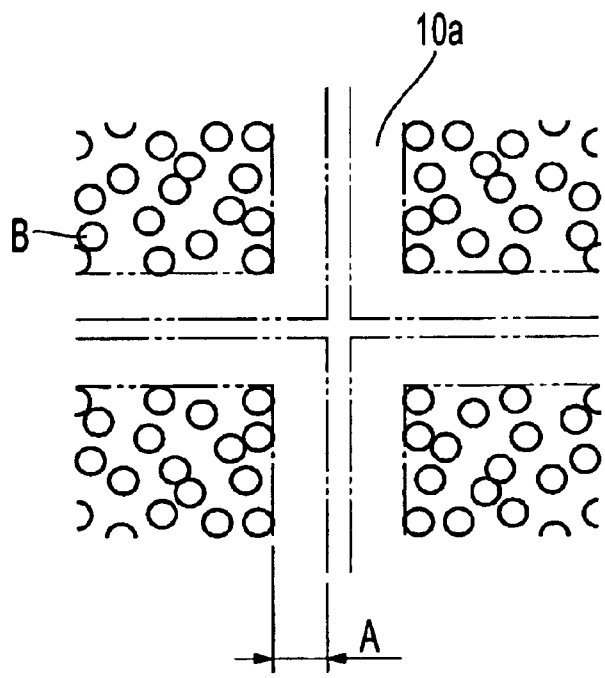
Figure 13:
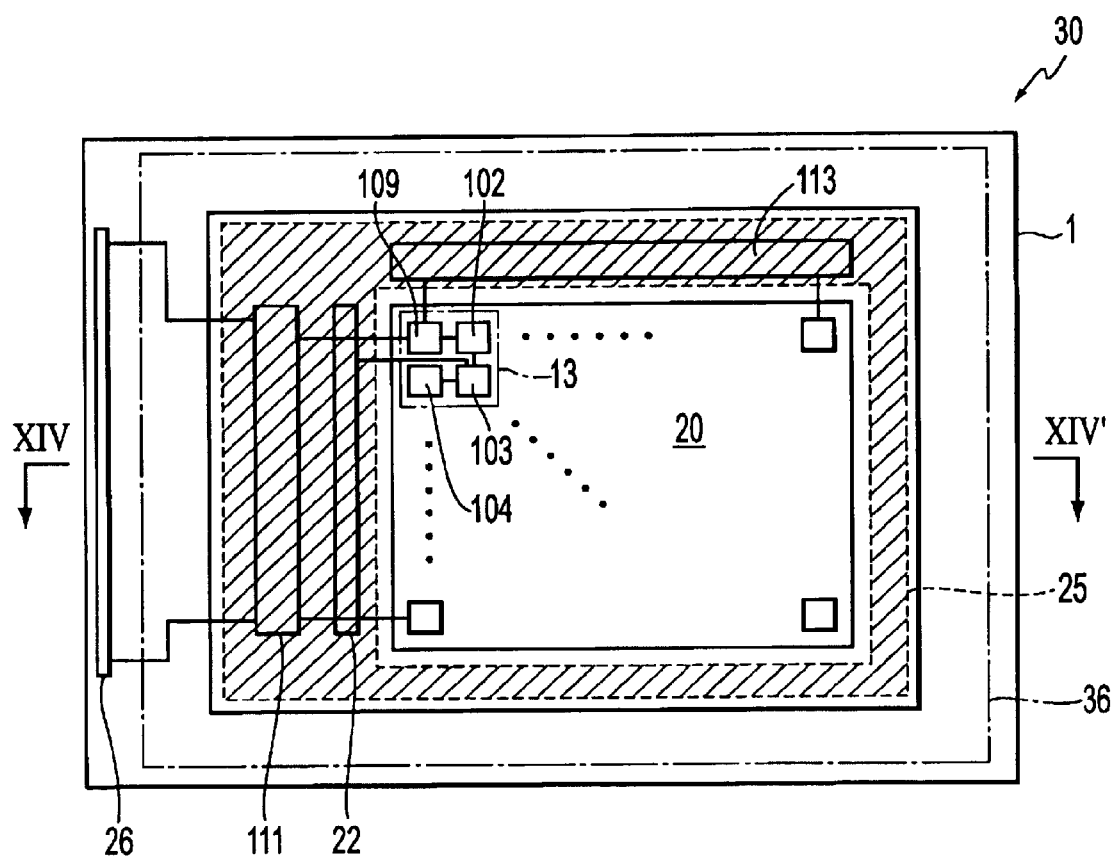
FIG. 13 is a plan view of the reflective liquid crystal panel configured using the liquid crystal panel substrate according to one of the embodiments.

Overall Configuration of Liquid Crystal Panel, and First Embodiment of Liquid Crystal Panel Substrate of Present Invention First of all, a description will be given of an overall configuration a liquid crystal panel including a liquid crystal panel substrate of the present invention, and a first embodiment of a liquid crystal panel substrate of the present invention referring to FIGS. 1, 5(a), 5(b) 13, and 14. FIG. 1 is a cross-sectional view of pixel regions of the reflector-side liquid crystal panel substrate according to the first embodiment of the present invention, FIG. 5(a) is a plan view of the pixel regions, and FIG. 5(b) is an enlarged plan view of gap sections of the reflector in FIG. 5(a). FIG. 13 is a plan view of an overall configuration of a liquid crystal panel, and FIG. 14 is a cross-sectional view taken along line XIV–XIV' thereof.

As shown in FIG. 1, for the reflector-side liquid crystal panel substrate according to the present invention, a substrate of semiconductor, shown as a substrate 1, is used. The material of the substrate 1 is not restricted to that used in the embodiment. For example, a transparent substrate such as a glass substrate may be used.

First, a description will be given of an outline of an overall configuration of the reflective liquid crystal panel of the present invention with reference to FIGS. 13 and 14.

Figure 14:
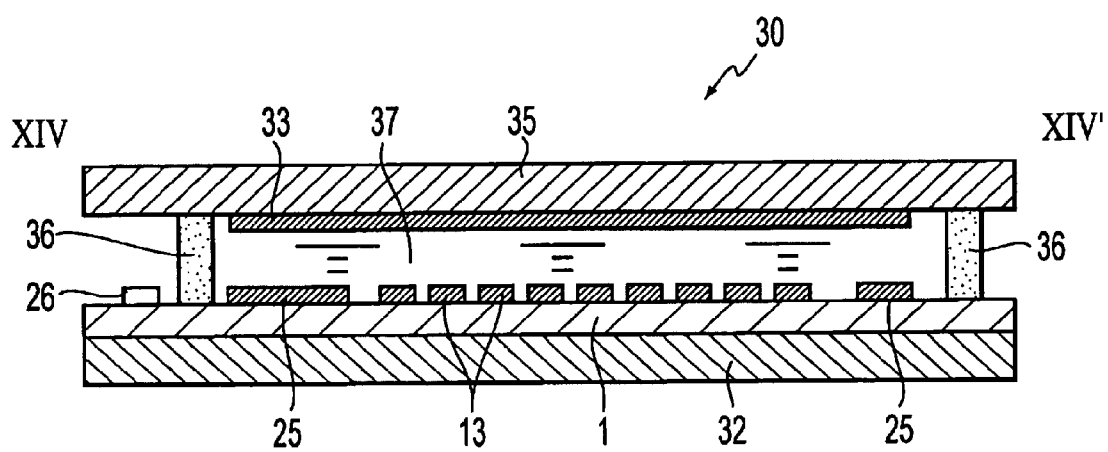
FIG. 14 is a cross-sectional view along line XIV–XIV' of FIG. 13.

As shown in FIGS. 13 and 14, an image display region 20 is provided in a central portion of the substrate 1 on the side of the reflector (lower side in FIG. 14), and line-scanning lines and column-scanning lines, described below, are arranged in a matrix in the image display region 20. Pixels are arranged at cross sections of the line-scanning lines and the column-scanning lines, reflectors 13 are arranged for the individual pixels, and in addition, liquid-crystal-pixel-driving circuits are provided below the reflectors 13 on the substrate 1. In regions around the image display region 20, there are provided a line-scanning-line-driving circuit 111 for feeding line-scanning signals to the line-scanning lines, a column-scanning-line-driving circuit 113 for feeding column-scanning signals to the column-scanning lines, and an input-data line 22 for receiving input data from outside sources via a pad region 26. The substrate 1 and a transparent opposed substrate 35 are adhered via a sealing material 36 to each other in the region surrounded by a single-dotted chain line and a solid line. The opposed substrate 35 is formed of, for example, glass, and is provided so as to oppose the substrate 1. A common electrode 33 is formed on an internal surface of the opposed substrate 35, and liquid crystal 37 is enclosed therebetween. Thus, a liquid crystal panel 30 is configured. In the hatched region between the dot lines around the image display region 20 on the substrate 1, provided is a light-shielding film 25 for shielding light that will be incident on the line-scanning-line-driving circuit 111, the column-scanning line driving circuit 113, and the input-data line 22 and for defining a periphery of the image display region 20.

Hereinbelow, with reference to FIG. 1, a detailed description will be given of a cross-sectional structure of the first embodiment of the liquid crystal panel substrate.

In FIG. 1, the substrate 1 is made of a p-type semiconductor substrate(or an n-type semiconductor substrate), such as monocrystal silicon, and an n-type well region 2 (or, a p-type well region) having a doping density higher than that of the substrate 1 is formed on a surface of the substrate 1. The well region 2 may be isolated from well regions where elements for forming peripheral circuits shown in FIG. 13, such as the column-scanning line driving circuit 113, the line-scanning-line-driving circuit 111, and the input-data line 22, are formed.

In the well region 2, an element-isolating field oxide film 3 (so-called "LOCOS")formed on the substrate 1 is formed by, for example, selection-thermal oxidization. An opening is formed in the element-isolating field oxide film 3; a gate electrode 5 made of a polysilicon material, a metal-silicide material, or the like, is formed in an internal center of the opening via a gate oxide film formed by performing thermal oxidization of the surface of the silicon substrate, and source and drain regions 6a and 6b are formed of doping layers on surfaces of the well region 2 on two sides of the gate electrode 5, thereby forming a field-effect transistor (which is referred to as a "FET", hereafter). Also, first conductive layers 8a and 8b, which are the first layers in the order from the substrate 1, are provided above the source and drain regions 6a and 6b via a first interlayer insulation film 7 made of, for example, a BPSG (boron phosphorus silica grass) film. The first conductive layers 8a and 8b are formed by, for example, accumulating 500 nm of aluminum layers or tantalum layers according to a sputtering method. The first conductive layer 8a is electrically connected to the source region 6a (or the drain region) via a contact hole formed in the first interlayer insulation film 7, thereby forming the source electrode (or the drain electrode) of the FET. The first conductive layer 8b is electrically connected to the drain region 6b (or the source region) via a contact hole formed in the first interlayer insulation film 7, thereby forming the drain electrode (or the source electrode) of the FET.

Above the first conductive layers 8a and 8b, a second interlayer insulation film 9 made of, for example, a silicon oxide film, is formed; and a contact hole 9b is provided in the second interlayer insulation film 9. Thereabove, second conductive layers 10a and 10b, which are the second layers in the order from the substrate 1, are formed. The second conductive layers 10a and 10b are formed by, for example, accumulating 500 nm of aluminum layers or tantalum layers according to a sputtering method. The first conductive layer 8b and the second conductive layer 10b electrically connected through the contact hole 9b can be formed by, for example, a sputtering method or a plasma CVD method using TEOS (tetraethoxysilicate). In this embodiment, for example, 1,100 nm of silicon oxide films are overlaid according to a TEOS-used plasma CVD method to form the second interlayer insulation film 9.

In one region corresponding to the gap between the reflectors 13, the second conductive layer 10a functions for shielding light so that incident light does not intrude into the semiconductor layer side (well region 2) on the substrate 1, thereby preventing the FET from leaking light. That is, this region is arranged to be planar to an extent of covering the gap between the reflectors 13 without, particularly, concave sections being formed (i.e., without small openings being formed). In the other regions corresponding to the reflectors 13, the second conductive layer 10a has concave sections including openings irregularly arranged as nesting cavities. It is preferable that the openings have a diameter in a range from 0.5 to 10 μm, and they may be arranged in an optional size or variable sizes within the given range. Also, the shape of the openings is not restricted to that in the embodiment; and, for example, it may be polygonal, such as to be regular octagonal. The manufacturing process for forming such holes is advantageous because it can be performed at the same time with the process of patterning a wiring or a light-shielding film from the second conductive layers 10a and 10b by photolithography or etching.

In the embodiment, the second conductive layer 10b is directly connected to the first conductive layer 8b via the contact hole 9b. However, a connecting plug made of a high-melting-point metal, such as tungsten, may be used for connection.

In addition, third interlayer insulation films 11a, 11b, and 11c having a three-layer structure are formed above the second conductive layers 10a and 10b. In this embodiment, the third interlayer insulation film 11a is formed of a silicon oxide film having a film thickness of 600 nm in an method, such as the plasma CVD method using TEOS; and the third interlayer insulation film 11b is formed of, for example, a silicon oxide film having a film thickness of 320 nm, by using a SOG (spin on glass) film. Although the thickness of the SOG film is not restricted to that in this embodiment, a preferable thickness range is from 100 to 500 nm so as to form appropriate concave sections in regions corresponding to the reflectors 13. After the third interlayer insulation film 11b is formed of the SOG film, etching may be performed for the SOG film and the third interlayer insulation film 11a in either non-selective conditions or optional conditions. In this embodiment, etching is performed for 500 nm of the third interlayer insulation films 11b and 11a in non-selective conditions. In this case, the amount of etching is not restricted to that in this embodiment, and it should preferably be in a range from 100 to 500 nm. The third interlayer insulation film 11c is formed of a 500-nm silicon oxide film according to the plasma CVD using TEOS in the same manner as for the third interlayer insulation film 11a. Thus, since concave sections formed on surfaces of the third interlayer insulation films 11a, 11b, and 11c are tapered in smoothly curved shapes, the reflector 13 having high reflection characteristics can be formed thereabove.

The second conductive layer 10a, the concurrently formed second conductive layer 10b, and the reflector 13 are connected by burying a connecting plug 12 made of a high-melting-point metal, such as tungsten, into a contact hole provided through the third interlayer insulation films 11a, 11b, and 11c.

After the connecting plug 12 is formed, a third conductive layer as the reflector 13, which is the third layer in the order from the substrate 1, is formed of, for example, an aluminum material by a low-temperature sputtering method. This method allows the reflector 13 having reflectance of 90% or greater to be formed.

According to the above, without an increase in production steps, reflectors having the most suitable reflection characteristics can be produced easily and with high reproducibility, thereby allowing provision of the reflective liquid crystal panel performable of bright reflection display of high quality on a natural base screen having wide viewing angles.

Particularly, in the described embodiment shown in FIG. 1, depending on existence and non-existence of the first conductive layers 8a and 8b, indented portions are created on the second conductive layer 10a positioned above the first conductive layers 8a and 8b. These indented portions finally cause indented portions to be created on the reflector 13. For this reason, compared to the case where concave sections are assumed to have been formed in a planar second conductive layer 10a, the surface of the reflector 13 can be arranged to have about four levels. This allows the scattering rate of reflecting light to be efficiently increased. Particularly, the arrangement allows prevention of defects, such as double-image display, which would be caused if the concave sections were formed on the planar conductive layer 10a. This embodiment is arranged such that wiring patterns formed with the first conductive layers 8a and 8b are used as they are so that concave sections are created. However, as in a second embodiment described below, patterning may be positively performed for the first conductive layers 8a and 8b as well so that small indented portions are created over the entire surface of the second conductive layer 10a, and a large number of very small concave-convex sections are created.

Hereinbelow, with reference to FIGS. 5(a) and 5(b), a description will be given of the concave sections and the light-shielding layer in the pixel regions of the liquid crystal panel substrate shown in FIG. 1.

In FIG. 5(a), in the pixel regions of the liquid crystal panel substrate of the first embodiment, the reflectors 13 having many smooth concave-convex sections are formed on the second conductive layer 10a having many concave sections. Also, the second conductive layers 10a not having many concave sections are formed so as to cover the gaps between the reflectors 13. Also, in the center of each of the reflector 13, the contact hole 9b is formed as a connection between the drain electrode (or the source electrode) 8b and the second conductive layer 10b, and the connecting plug 12 is adjacently formed for connecting the second conductive layer 10b and the reflector 13.

As shown in the enlarged view in FIG. 5(b), the second conductive layer 10a has concave sections where openings are irregularly arranged as nesting cavities in an area B corresponding to the reflector 13. A region corresponding to the gap between the reflectors 13, not having the region B, does not have the concave sections so that incident light is not allowed to pass into the semiconductor-layer side to prevent FETs from causing light leakage. In this embodiment, the shape of the openings is circular. It is preferable that the openings have a diameter in a range from 0.5 to 5 μm, but they may be arranged in an optional size or in variable sizes within the given range. Also, the shape of the opening is not restricted to that in this embodiment, however, it may be polygonal, such as to be octagonal.

Also, in FIG. 5(b), a distance A from the end of the reflector 13 up to the end of the concave section is not particularly restricted. Preferably, however, it should be about 3 μm or longer to produce the shielding function.

Second Embodiment of Liquid Crystal Panel Substrate of Present Invention

Figure 2:
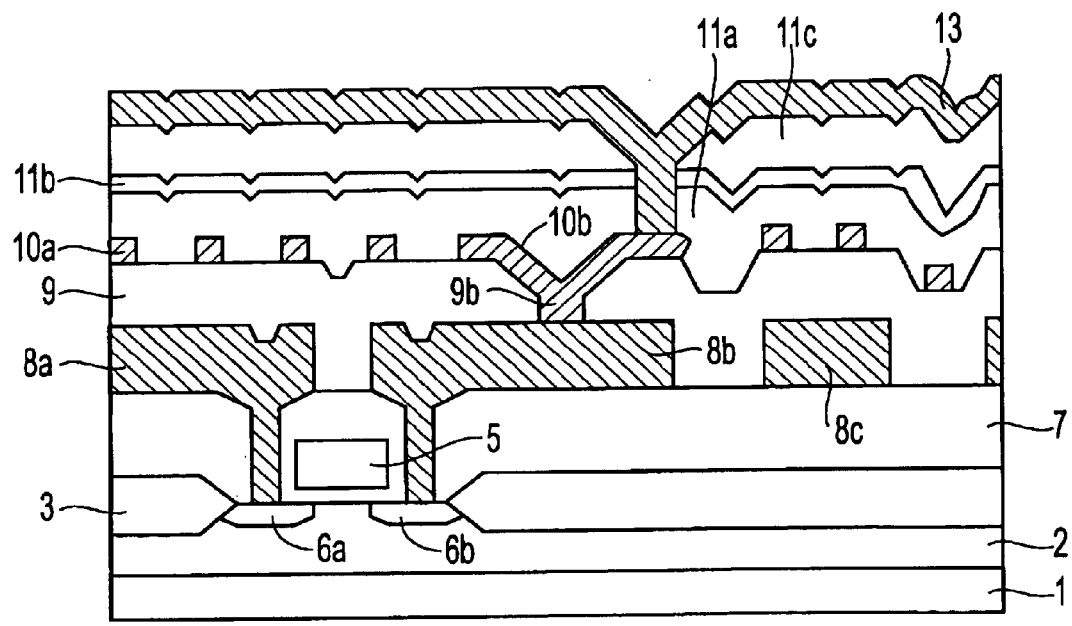
FIG. 2 is a cross-sectional view of pixel regions of a second embodiment of a reflector-side liquid crystal panel substrate that constitutes a reflective liquid crystal panel to which the present invention is applied.

Hereinbelow, with reference to FIGS. 2, 5(a) and 5(b), a description will be given of a second embodiment of the liquid crystal panel substrate according to the present invention. FIG. 2 is a cross-sectional view of the second embodiment of the reflector-side liquid crystal panel substrate. FIG. 2 uses the same reference symbols for configuration elements similar to those shown in FIG. 1, and descriptions thereof are omitted.

As shown in FIG. 2, the second embodiment does not use a connecting plug 12 such as that used in the first embodiment, and directly connects a second conductive layer 10b and a reflector 13 via a contact hole. Therefore, this embodiment is significantly effective in simplifying manufacturing steps. Also, in the second embodiment, in addition to first conductive layers 8a and 8b, another first conductive layer 8c is formed. The first conductive layer 8c is patterned so that small indented portions are created over the entire surface of the second conductive layer 10a, and many very small concave sections are provided. For this reason, compared to the case where concave sections are assumed to have been formed in a planar second conductive layer 10a, the surface of the reflector 13 can be arranged to have about four levels. This allows the scattering rate of reflecting light to be efficiently increased. Other configurations are similar to those in the first embodiment shown in FIG. 1. Particularly, arrangement of the concave sections and a light-shielding layer in pixel regions of the second embodiment is also similar to that in the first embodiment shown in FIGS. 5(a) and 5(b).

Third Embodiment of Liquid Crystal Panel Substrate of Present Invention

Figure 3:
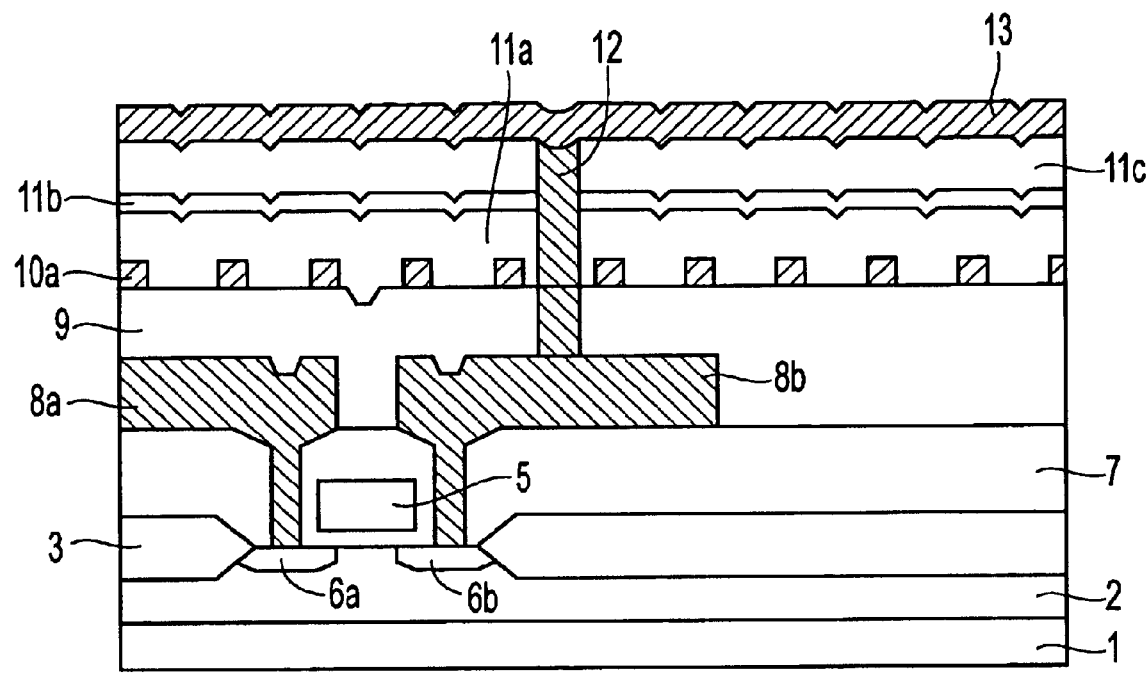
FIG. 3 is a cross-sectional view of pixel regions of a third embodiment of a reflector-side liquid crystal panel substrate that constitutes a reflective liquid crystal panel to which the present invention is applied.

Hereinbelow, with reference to FIGS. 3 and 6, a description will be given of a third embodiment of the liquid crystal panel substrate according to the present invention. FIG. 3 is a cross-sectional view of the third embodiment of the reflector-side liquid crystal panel substrate. FIG. 3 uses the same reference symbols for configuration elements similar to those shown in FIG. 1, and descriptions thereof are omitted.

As shown in FIG. 3, the third embodiment does not use a second conductive layer 10b such as that used in the first embodiment, but uses a connecting plug 12 to electrically connect a drain electrode (or a source electrode) 8b and a reflector 13. For the connecting plug 12, a high-melting-point metal, such as tungsten, is used.

Figure 6:
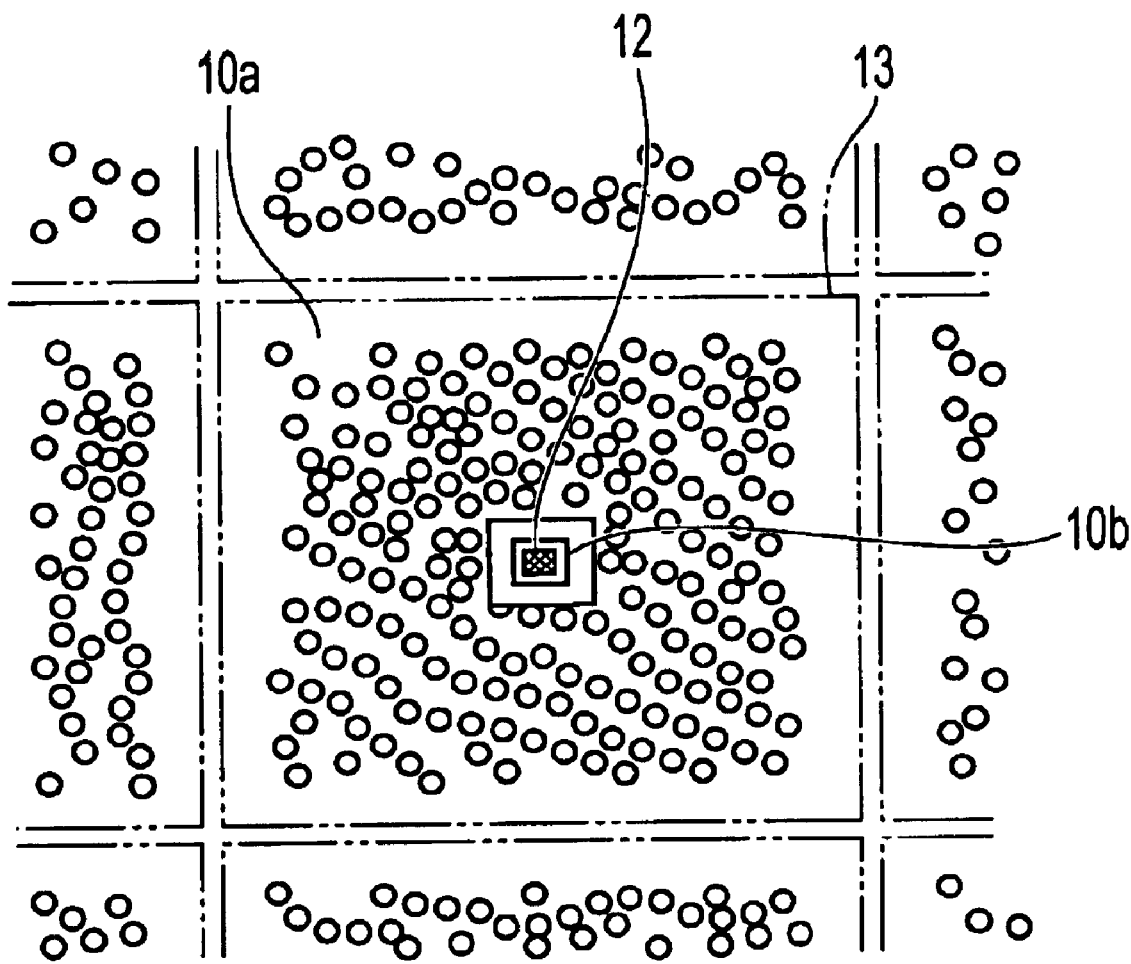
FIG. 6 is a plan view of arrangements of concave sections and a light-shielding layer in the pixel regions of the third embodiment.

In this case, as shown in FIG. 6, concave sections in which openings are irregularly arranged as nesting cavities on a second conductive layer 10a can be formed all over an image display region 20 except for a peripheral area of a contact hole where the connecting plug 12 is formed and the gap between the reflectors 13 in each pixel. This allows formation of reflectors having even more suitable reflection characteristics.

Also, in the third embodiment, as shown in FIG. 3, smoothing processing is performed for a second interlayer insulation film 9. By the smoothing processing, the surface of the reflector 13 can be formed to be concave and convex according to concave sections formed in the second conductive layer 10a without relying on indented portions and concave-convex sections on a base surface of the second conductive layer 10a. Therefore, the entire surface of the reflector 13 can be formed to be in a uniformed convex and concave condition. Other configurations are similar to those in the first embodiment shown in FIG. 1.

Fourth Embodiment of Liquid Crystal Panel Substrate of Present Invention

Figure 4:
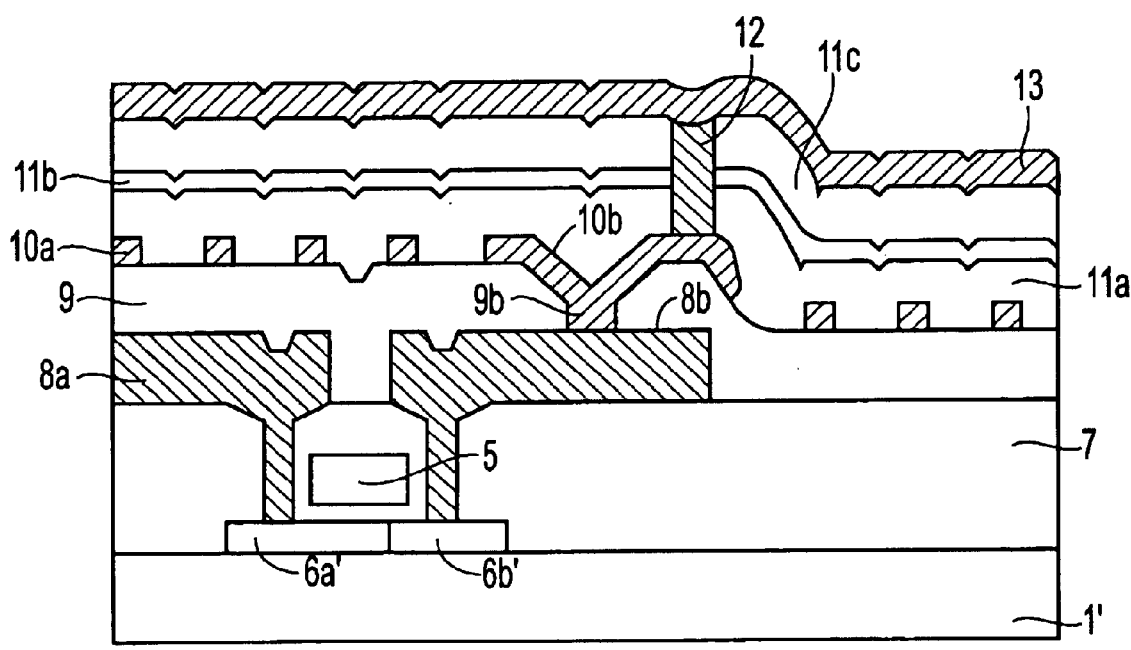
FIG. 4 is a cross-sectional view of pixel regions of a fourth embodiment of a reflector-side liquid crystal panel substrate that constitutes a reflective liquid crystal panel to which the present invention is applied.

Hereinbelow, with reference to FIGS. 4, 5(a) and 5(b), a description will be given of a fourth embodiment of the liquid crystal panel substrate according to the present invention. FIG. 4 is a cross-sectional view of the fourth embodiment of the reflector-side liquid crystal panel substrate. FIG. 4 uses the same reference symbols for configuration elements similar to those shown in FIG. 1, and descriptions thereof are omitted.

As shown in FIG. 4, the fourth embodiment is different from the first embodiment in that a substrate 1' is made of one of quartz and non-alkaline glass substrates on which one of monocrystal, polycrystal, and amolphous silicon films (a cambial layer in source and drain regions 6a' and 6b') is formed. Also, a gate insulation film is formed on the silicon film. The gate insulation film is made of a double-layered structure of, for example, an oxide silicon film formed by thermal oxidization and a nitride silicon film overlaid by a CVD method. In addition, the silicon film is doped with n-type impurities (p-type impurities); source and drain regions 6a' and 6b' of a TFT are formed; and a gate electrode 5 of the TFT is formed of polysilicon, metal silicide, or the like on the gate insulation film. Other configurations are the same as those in the first embodiment. Particularly, in the same way as in the first embodiment, films and layers are overlaid on the gate electrode 5 in the order of a first interlayer insulation film 7, first conductive layers 8a and 8b, a second interlayer insulation film 9, second conductive layers 10a and 10b, third interlayer insulation films 11a, 11b, and 11c, and the reflector 13. Also, arrangement of concave sections and a light-shielding layer in pixel regions is similar to that in the first embodiment shown in FIGS. 5(a) and 5(b).

In FIG. 4, the gate electrode 5 is a top-gate type that positions above a channel. However, it may be a bottom-gate type that is formed in a manner that a gate electrode is first formed, and a silicon film working as a channel is arranged thereon via a gate insulation film.

In the described first to fourth embodiments, by forming openings, that is, concave sections, on the second conductive layer 10a, the second conductive layer 10a are formed so as to be concave and convex (refer to FIGS. 1 to 4). However, the second conductive layer 10a may be formed so as to be concave and convex either by forming concave sections on the second conductive layer or by forming a large number of very small protrusions on the second conductive layer. In this case as well, the second conductive layer 10a can be formed so as to be concave and convex by photolithographic processing and etching in the same processing step in which the second conductive layer 10b is formed.

Figure 7:
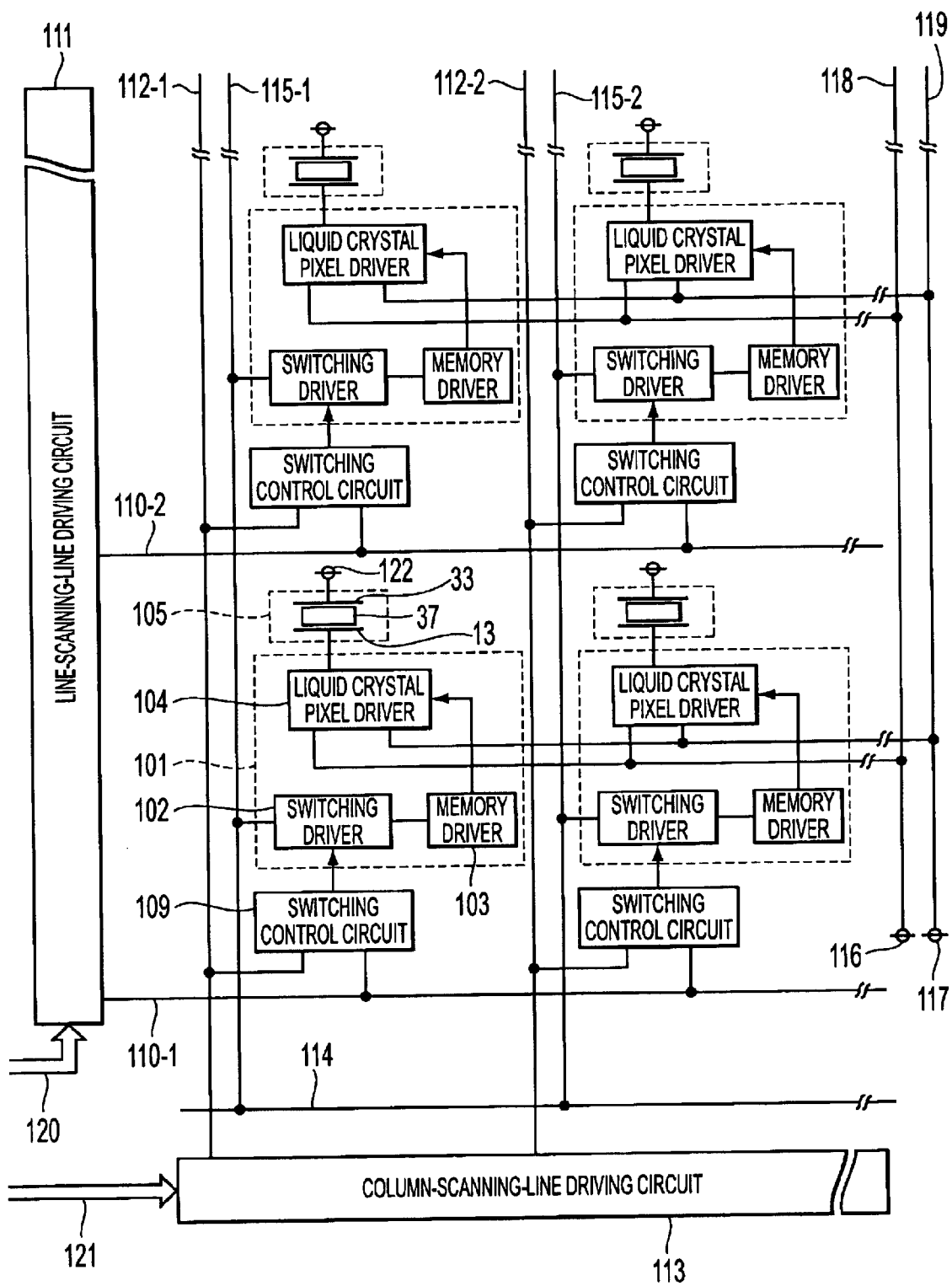
FIG. 7 is a schematic view of example components, such as pixels and driving circuits, in the liquid crystal panel using the liquid crystal panel substrate according to one of the embodiments.
Figure 8:
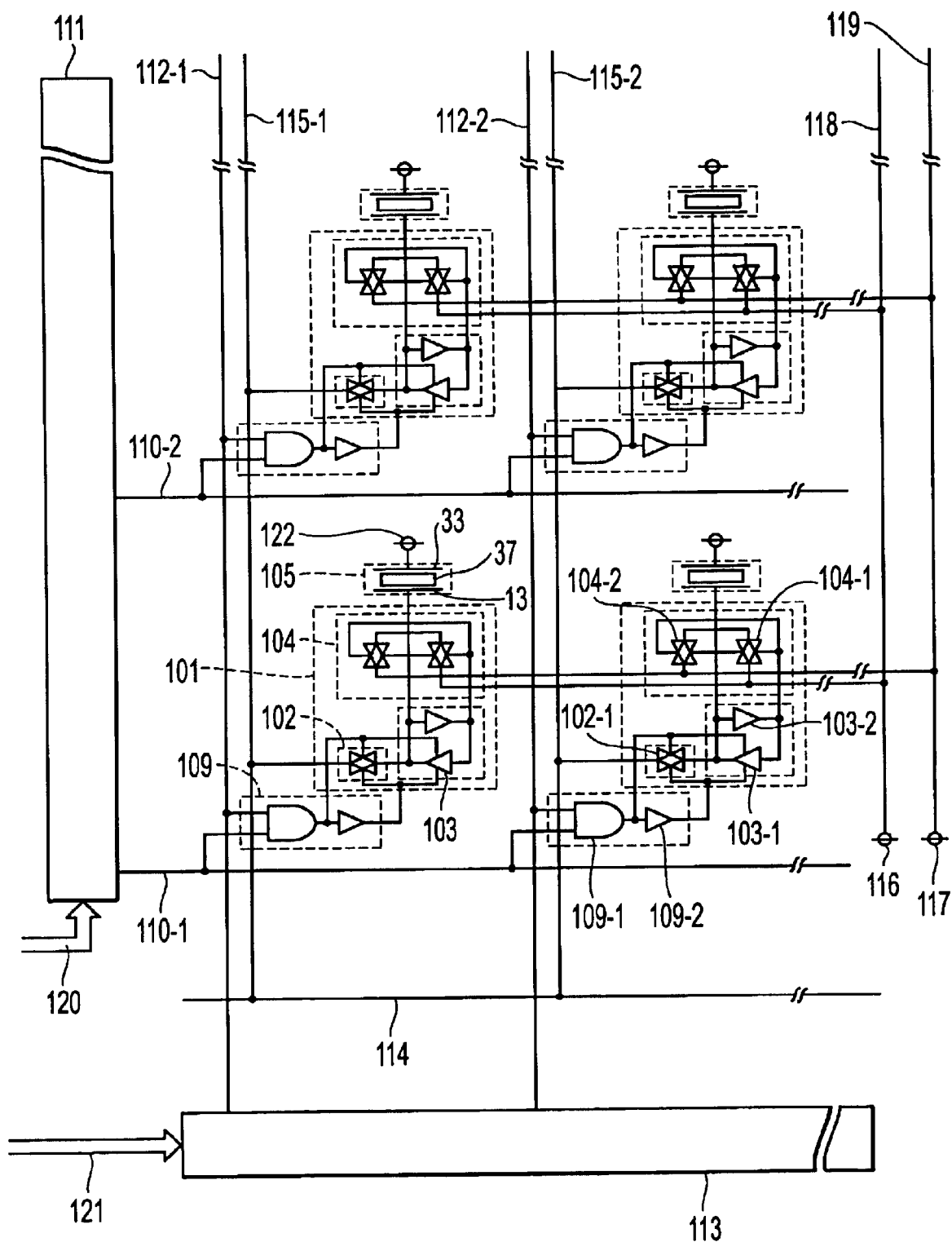
FIG. 8 is a circuit diagram showing driving circuits according to FIGS. 7 and 8, which are configured of CMOS transistors.

Description Regarding Pixels and Driving Circuits therefor in Liquid Crystal Panel of the Present Invention Hereinbelow, with reference to FIGS. 7 and 8, a description will be given of example driving circuits provided for individual pixels and arranged for driving the individual pixels by using, as pixel electrodes, the reflectors configured as in the described embodiments. FIG. 7 is a block diagram of an example of the pixels and driving circuits therefor in a liquid crystal panel of the present invention. FIG. 8 is a circuit diagram of a configuration in which the driving circuits in FIG. 7 are arranged with CMOS transistors.

In FIG. 7, in an image-display region pixel, line-scanning lines 110-n (n represents a natural number indicating the number of the line-scanning line) and column-scanning lines. 112-m (m represents a natural number indicating the number of the column-scanning line) are arranged in a matrix. The driving circuit for each of the pixels is arranged at a cross section of the scanning lines. Also arranged in the image-display region are column data lines 115-d (d represent a natural number indicating the number of the column data line) branched from an input-data line 114 along the column-scanning lines 112-m. A line-scanning-line-driving circuit 111 is arranged in a peripheral region on the side of the lines in the image-display region, and a column-scanning-line-driving circuit 113 is arranged in a peripheral region on the side of the columns in the image-display region.

Line-scanning-line-driving-circuit control signals 120 control the line-scanning-line-driving circuit 111, and selecting signals are outputted to selected line-scanning line 110-n. Unselected line-scanning lines are set to nonselection potentials. Similarly, column-scanning-line-driving-circuit control signals 121 control the column-scanning line driving circuit 113, selecting signals are outputted to selected column-scanning lines 112-m, and unselected column-scanning lines are set to nonselection potentials. Thus, the control signals 120 and 121 determine line-scanning lines and column-scanning line, respectively, for selection. That is, the control signals 120 and 121 are address signals for specifying selection pixels.

Each of switching control circuits 109 is arranged near the cross section of the selected line-scanning line 110-n and the selected column-scanning line 112-m. Upon receipt of selecting signals for both scanning lines, it outputs ON signals, while it outputs an OFF signal when at least one of the line-scanning line 110-n and the column-scanning line 112-m is not selected. That is, ON signals are outputted only from the switching control circuits 109 for the pixels positioned at cross sections of the selected line-scanning lines and column-scanning lines, and OFF signals are outputted from other switching control circuits 109. The embodiments use ON and OFF signals, thereby controlling liquid-crystal-pixel-driving circuits 101.

Hereinbelow, with reference to FIG. 7, a description will be given of a configuration and operations of the liquid-crystal-pixel-driving circuits 101.

As shown in FIG. 7, each of the liquid-crystal-pixel-driving circuits 101 is configured of a switching circuit 102, a memory circuit 103, and a liquid-crystal pixel driver 104.

The switching circuit 102 turns to be conductive according to an ON signal received from the switching control circuit 109. Having turned to be conductive, the switching circuit 102 writes a data signal from the connected column data line 115-d to the memory circuit 103 via the switching circuit 102. In contrast, having turned to be nonconductive according to an OFF signal received from the switching control circuit 109, the switching circuit 102 allows the data signal written to the memory circuit 103 to be preserved.

The data signal preserved in the memory circuit 103 is fed to the liquid-crystal pixel driver 104 arranged for each pixel.

According to the level of the fed data signal, the liquid-crystal pixel driver 104 feeds one of a first voltage 116 to be fed to a first voltage signal line 118 and a second voltage 117 to be fed to a second voltage signal line 119 to a reflector 13 of a liquid-crystal pixel 105. The first voltage 116 turns the liquid-crystal pixel 105 in a normally-white display condition on the liquid crystal panel to a black-display condition. In contrast, the second voltage 117 turns the liquid-crystal pixel 105 to a white-display condition.

When the data signal preserved in the memory circuit 103 is at an H level, a gate to be connected to the first voltage signal line 118 that turns liquid crystal performing a normally-white display to perform a black display turns to be conductive in the liquid-crystal pixel driver 104. Thereby, the first voltage 116 is fed to the reflector 13 for each pixel, and the liquid-crystal pixel 105 turns to the black-display condition according to the potential difference from a reference voltage 122 to be fed to an opposing electrode 108. Similarly, when the data signal preserved in the memory circuit 103 is at an L level, a gate to be connected to the second voltage signal line 119 turns to be conductive in the liquid crystal pixel driver 104, thereby the second voltage 117 is fed to the reflector 13 and the liquid crystal pixel 105 turns to the white-display condition.

According to the above-described configuration, driving can be performed with a voltage as low as a logical voltage for a supply voltage, the first voltage 116, the second voltage 117, and the reference voltage 122. In addition, when no rewriting is required for screen displays, since a data-preservation function of the memory circuit 103 maintains the display condition, almost no current flows in the configuration.

The reflector 13 is provided for each of the pixels and is fed with one of the first voltage 116 and the second voltage 117 that the liquid-crystal pixel driver 104 outputs according to the preserved data signal. Also, the potential difference between the two voltages is applied to a liquid-crystal layer 107 provided between the reflector 13 and the opposing electrode 108. According to variations in orientation of liquid-crystal molecules, which occur corresponding to the potential difference, the liquid-crystal pixel 105 turns to be in one of the black-display condition (which is also referred to as an "ON-display condition") and the white-display condition (which is also referred to as an "OFF-display condition"). As described above, the liquid crystal panel is configured such that the liquid crystal 37 is enclosed between the substrate 1, which is the semiconductor substrate or the like, and the opposed substrate 35 made of glass or the like (refer to FIG. 14); components such as the reflectors 13 are arranged in a matrix; and liquid-crystal-pixel-driving circuits 101, the line-scanning lines 110-n, the column-scanning lines 112-m, column data lines 115-d, the line-scanning line driving circuit 111, and the column-scanning line driving circuits 113 are formed below the reflectors 13 (refer to FIG. 13). Regarding the pixels, voltage is applied between the reflector 13 and the opposing electrode 33 for each of the pixels, and voltage is fed to the liquid crystal 37 for each of the pixels therebetween, and thereby, orientation of liquid-crystal molecules is varied for each of the pixels.

Hereinbelow, a description will be given of an example of particular configurations of circuits, such as the liquid-crystal-pixel-driving circuits, described above.

As shown in FIG. 8, in the described embodiments, the switching control circuit 109 can be configured of a NOR gate circuit 109-1 of a CMOS-transistor configuration and logical circuit of an inverter 109-2 of a CMOS-transistor configuration. The NOR gate circuit 109-1 outputs an ON signal of the positive logic when selecting signals of the negative logic are inputted for two inputs, and outputs an ON signal of the negative logic according to the inverter 109-2. The switching circuit 102 can be configured using a transmission gate 102-1 of a CMOS-transistor configuration. The transmission gate 102-1 turns to be conductive according to the ON signal from the switching control circuit 109 to connect the column-scanning line 115 and the memory circuit 103, and turns to be nonconductive according to an OFF signal. The memory circuit 103 can be configured by feedback connection of a clocked inverter 103-1 of a CMOS-transistor configuration and an inverter 103-2 of a CMOS-transistor configuration. The data signal is transferred from the switching circuit 102 to the memory circuit 103 according to the ON signal outputted from the switching control circuit 109 and is inverted according to the inverter 103-2. Then, the output is fed back according to the clocked inverter 103-1 that operates according to the OFF signal outputted from the switching control circuit 109, and the data signal is then preserved. The liquid-crystal pixel driver 104 can be configured of two transmission gates 104-1 and 104-2 of CMOS-transistor configurations. In the liquid-crystal pixel driver 104, when the data signal preserved in the memory circuit 103 is at an H level, the transmission gate 104-1 connected to the first voltage signal line 118, which causes the liquid crystal in the normally-white condition to perform the black-display, thereby turns to be conductive, the first voltage 116 is fed to the reflector 13, and the liquid-crystal pixel 105 turns to be in the black-display condition according to the potential difference from the reference voltage 122 that is fed to the opposing electrode 108. Similarly, when the preserved data signal is at an L level, the transmission gate 104-2 connected to the second voltage signal line 119 turns to be conductive, the second voltage 117 is fed to the reflector 13, and the liquid-crystal pixel 105 thereby turns to be in the white-display condition.

Figure 9:
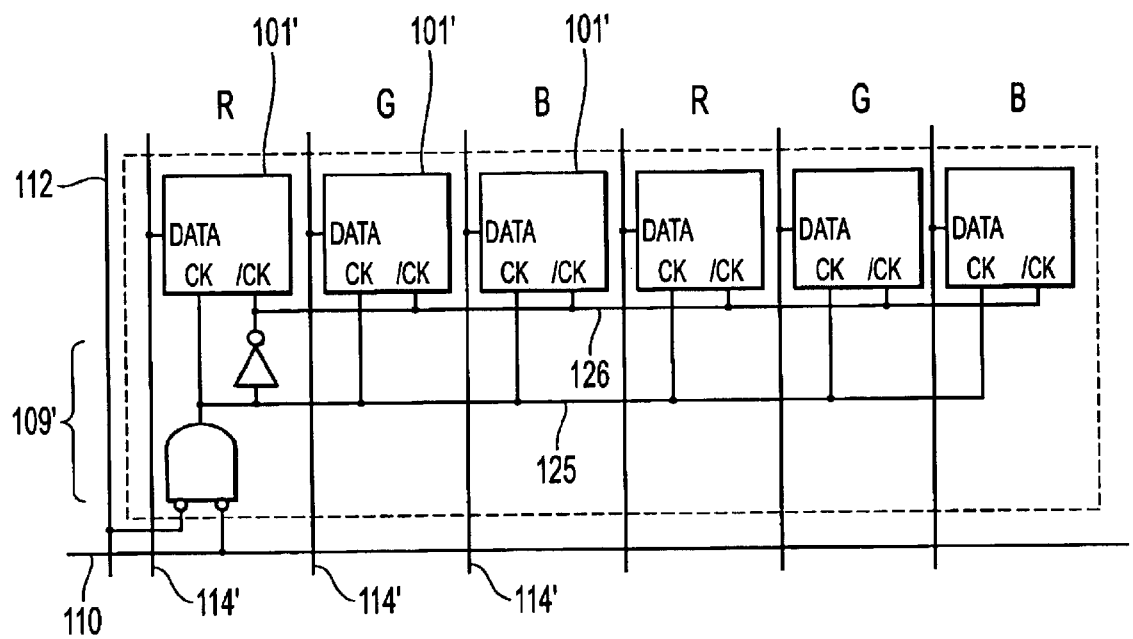
FIG. 9 is a circuit diagram showing a configuration example of the driving circuit in the pixel regions in a color liquid crystal panel according to one of the embodiments.
Figure 10A:
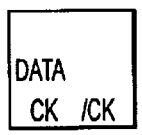
FIGS. 10(a) and 10(b) show a symbolic drawing (FIG. 10(a)) of one liquid-crystal-pixel-driving circuit included in the driving circuit in FIG. 9, and also shows a circuit diagram (FIG. 10(b)) showing a particular circuit configuration corresponding thereto.
Figure 10B:
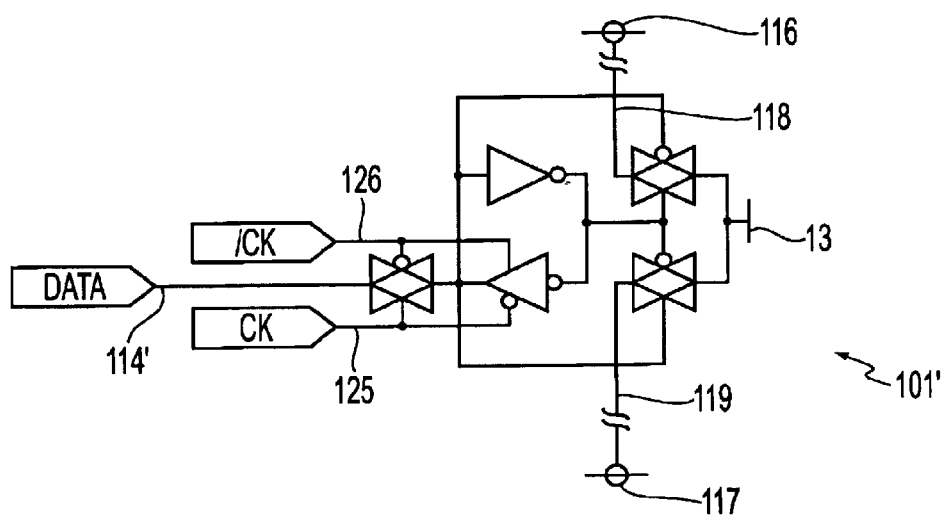
Figure 11:
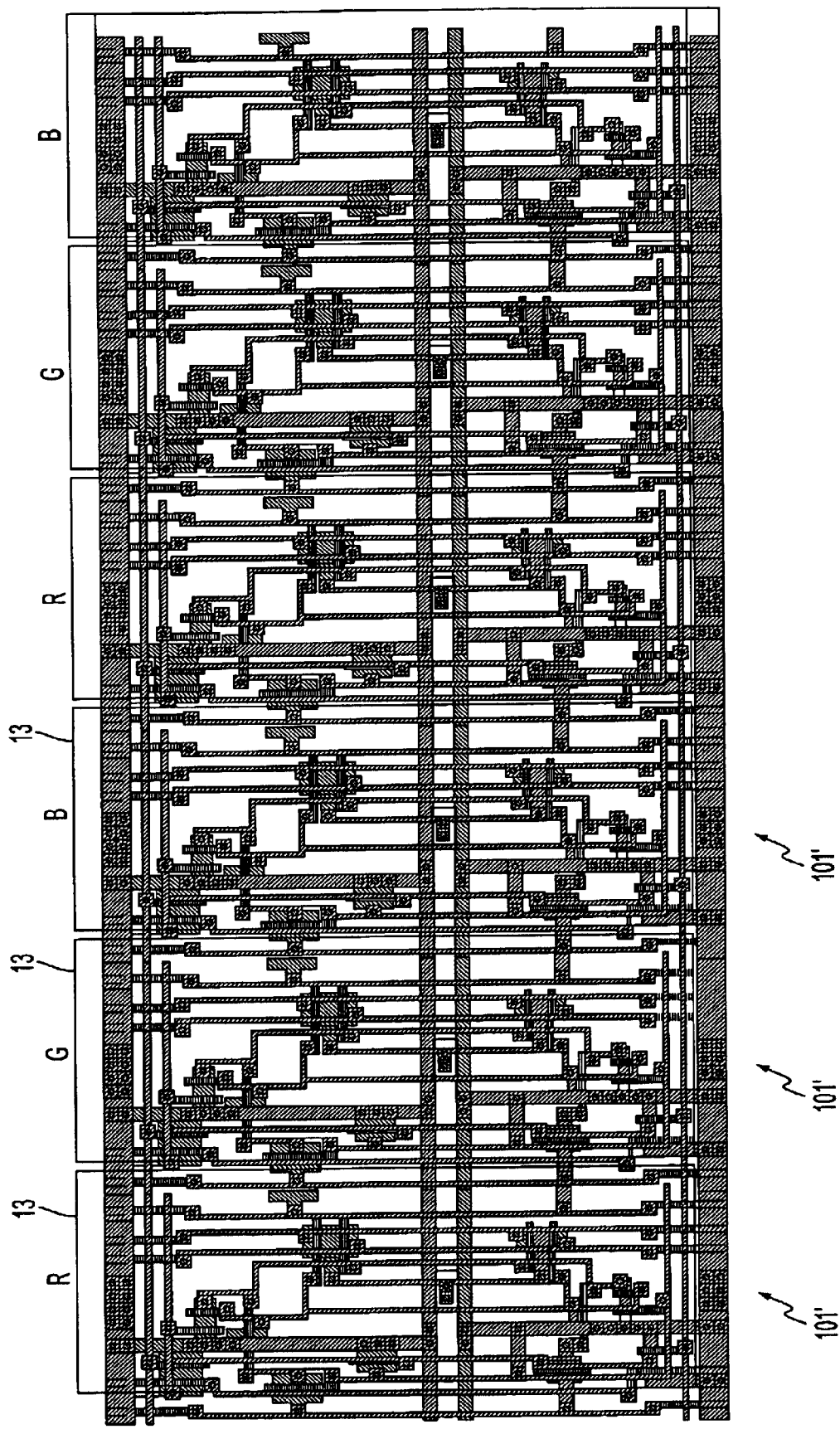
FIG. 11 is a plan view of layout patterns of the driving circuits in FIG. 9.
Figure 12:
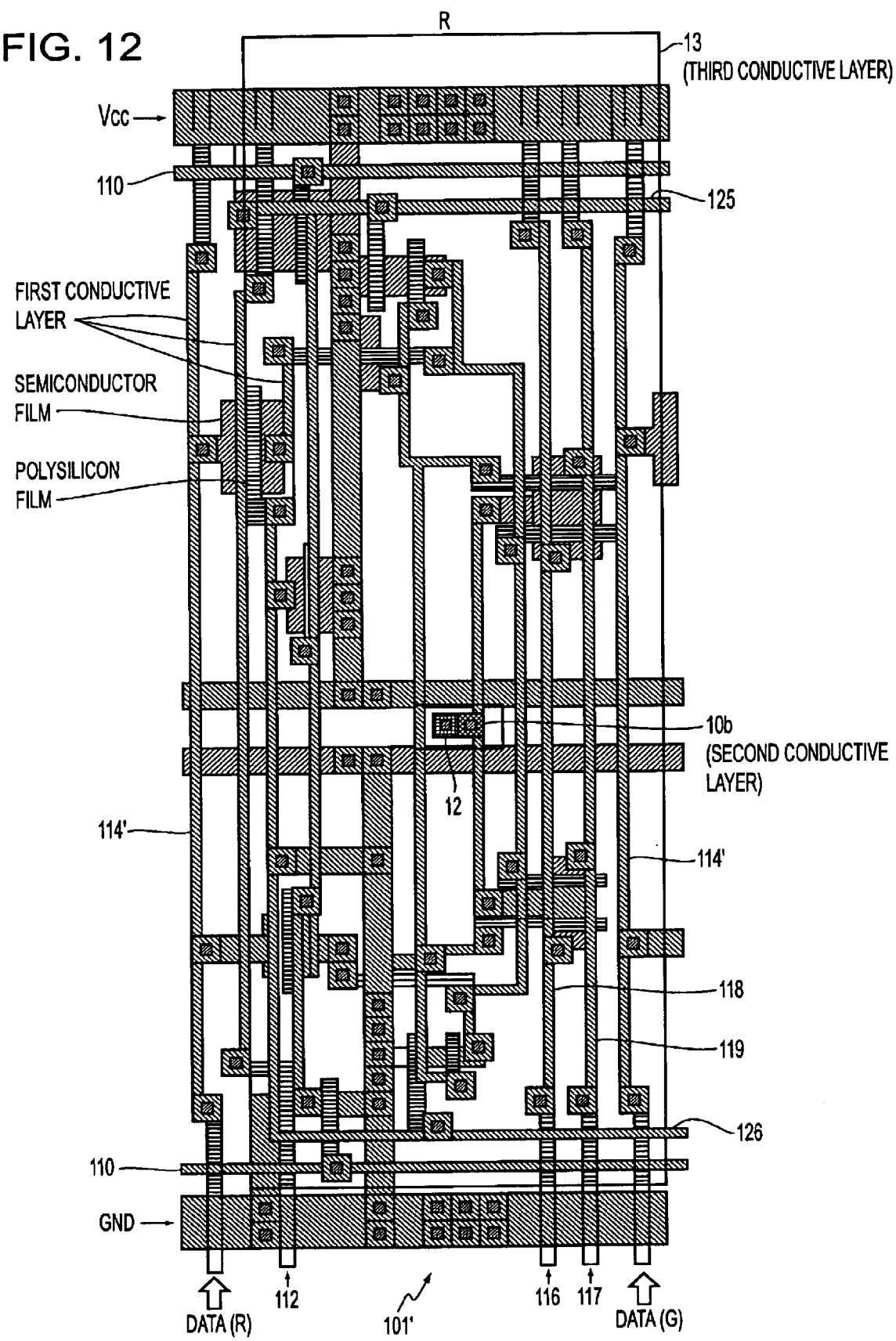
FIG. 12 is an enlarged plan view of a portion of one of the liquid-crystal-pixel-driving circuits in the layout patterns of the driving circuits in FIG. 11.

Hereinbelow, with reference to FIGS. 9 to 12, a description will be given of different examples of driving circuits, each of which is to be provided for each of the pixels and is configured so as to drive the pixel by use of the reflector as the pixel electrode configured as in the above-described embodiments. FIG. 9 is a circuit diagram showing different examples of the pixels, the driving circuits therefor, and the like, of the liquid crystal panel of the present invention; FIGS. 10(a) and 10(b) are circuit diagrams showing a particular configuration of one of the abovementioned liquid-crystal-pixel-driving circuits; FIG. 11 is a plan view showing layout patterns of the above; and FIG. 12 is an enlarged plan view of a portion of one of the above mentioned liquid-crystal-pixel-driving circuits. In FIGS. 9 to 12, the same reference symbols are used for configuration elements similar to those shown in FIGS. 7 and 8.

The example configuration of the driving circuit, shown in FIG. 9, is suitable particularly to a color liquid crystal panel, in which a switching control circuit 109' is connected to six liquid-crystal-pixel-driving circuits 101' arranged in the line direction for R, G, B, R, G, and B in the given order. Six video signals (sequentially for R, G, B, R, G, and B) subjected to serial-parallel conversion are individually inputted at the same time to the six liquid-crystal-pixel-driving circuits 101' under control of the same switching control circuit 109' (that is, as a driving circuit for identical addresses) via individually different input-data lines 114'. A color filter for each color (R, G, or B) is formed in a reflector 13 connected to each of the individual liquid-crystal-pixeldriving circuits 101' in an opposing position on a substrate 1 or a substrate 2. In the above, the six liquid-crystal-pixel-driving circuits allow displays in colors corresponding to color video signals in the individual pixels.

In the described example configuration, similarly to the configuration shown in FIG. 8, the switching control circuit 109' is configured of a NOR gate circuit of a CMOS-transistor configuration and an inverter of a CMOS-transistor configuration, thereby feeding clock signals CK to clock-input terminals of the six liquid crystal pixel driving circuits 101' via a clock signal line 125, and concurrently, feeding inverse clock signals /CK to inverse clock-input terminals of six liquid-crystal-pixel-driving circuits 101' via an inverse clock-signal line 126.

Also, one of the liquid-crystal-pixel-driving circuits 101' shown in FIG. 9 is as shown in a symbolic drawing in FIG. 10(*a*); and a particular circuit configuration corresponding thereto is, for example, as shown in FIG. 10(*b*). Similarly to the configuration shown in FIG. 8, the circuit is configured of a transmission gate of a CMOS-transistor configuration, and a clocked inverter and an inverter of CMOS-transistor configurations, in which one of a first voltage 116 and a second voltage 117 is applied to a reflector 13 corresponding to data (DATA) fed from an input-data line 114' with timing of clock signals CK and preserved.

Accordingly, operation of the driving circuit shown in FIG. 9 is the same as in the case shown in FIGS. 7 and 8, except for performing concurrent operations for the multiple reflectors 13.

FIG. 11 is a detailed plan view of example layout patterns of the driving circuits shown in FIG. 9, and FIG. 12 is an enlarged view of a portion corresponding to one of the liquid-crystal-pixel-driving circuits 101' shown therein.

As shown in FIGS. 11 and 12, the liquid-crystal-pixel-driving circuits 101' and various wiring connected to thereto are arranged under each of the reflector 13. Particularly, in FIG. 12, a first conductive layer (layer formed in the hatched regions in the figure) is used to form the majority of the wiring, such as an input-data line 114', a line-scanning line 110, a column-scanning line 112, a clock signal line 125, an inverse clock signal line 126, a grounding line (GND), a predetermined-power line (Vcc), a first voltage signal line 118, and a second signal line 119. Also, in portions where the wiring must be crossed with each other, intermediate wiring sections are formed mainly of a conductive polysilicon film (film formed in the non-hatched regions in the figure) that is the same as that for a gate electrode. In the figure, individual contact holes for electrically connecting different layers, such as conductive layers and semiconductor layers, are shown with black squares. In the contact holes, connecting plugs may be or may not be provided. Also, each of the transistors has gate electrodes opposing each other via an insulation film (not shown) formed on a P type or N type conductive polysilicon film (film formed in the hatched regions in the figure). In addition, similarly to those in FIG. 5, the first conductive layer (drain or source electrode) and the reflector 13 are connected via a second conductive layer 10*b* and connecting plug 12.

As can be seen in FIGS. 11 and 12, since the second conductive layer 10*b* formed in slight regions in the plan views is sufficient, the second conductive layer can be widely formed in the majority of regions on the substrate. Also, by forming the second conductive layer 10*a*, not shown in FIGS. 11 and 12 (refer to FIGS. 1 to 6) in a concave and convex condition, effective reflection characteristics can be given to the reflectors 13. In addition, since the first conductive layer is used to form the wiring, by use of the characteristics in existence or nonexistence of the first conductive layer 8*a*, as described above, indented portions can be provided on the surface of the reflector 13 via the second conductive layer 10*a*, thereby allowing further improvement in the reflection characteristics to be achieved. In FIG. 12, by use of planar regions where the first conductive layer 8*a* is not formed (that is, regions where the wiring is not formed) to positively perform patterning for the first conductive layer 8*c* (refer to FIG. 2) as in the described second embodiment, small indented portions can be provided uniformly on the second conductive layer 10*a*.

Description Regarding Structure of Liquid-crystal panel of Present Invention

Hereinbelow, referring again to FIGS. 13 and 14, a description will be given of an overall structure configured of the liquid crystal panel according to each of the described embodiments. FIG. 13 is a plan view of the entire liquid crystal panel, and FIG. 14 is a cross-sectional view along line XIV–XIV' thereof.

As shown in FIG. 13, in the liquid crystal panel 30, as described above, the line-scanning-line-driving circuit 111, the column-scanning line driving circuit 113, and input-data line 22 are provided on a peripheral region covered by the light-shielding film 25 as circuits for driving pixels. Also, in the image display region 20 (below the reflectors 13) as described above, the switching control circuits 109, the switching circuits 102, the memory circuits 103, and the liquid-crystal pixel drivers 104 are provided. The light-shielding film 25 is configured of the third conductive layer formed in the same processing step as for the reflectors 13, in which a predetermined potential, such as an LC common electrode potential, is applied. In the pad region 26 for supplying power supply voltage, pads and terminals are formed.

As shown in FIG. 14, the reverse surface of the substrate 1 is adhered to a substrate 32 made of glass, ceramics, or the like, with an adhesive. In addition, on the front surface of the substrate 1, the glass substrate 35 on the light incident side having the opposing electrode 33 is provided with an appropriate gap, wherein the glass substrate 35 is made of a transparent conductive film (ITO) to which an LC common electrode potential is applied. In the gap adhered with a sealing material 36 formed in a sealing-material forming region 36 in FIG. 6, there is filled the liquid crystal 37, such as a liquid crystal of the well-known twisted nematic (TN) type or a liquid crystal of a superhomeotropic (SH) type such that liquid crystal molecules are oriented almost vertically in the voltage non application condition. Thus, the liquid crystal panel 30 is configured. The position where the sealing materials 36 are predetermined so that the pad region 26 is arranged outside of the sealing materials for receiving inputted signals from the outside sources.

The light-shielding film 25 on peripheral circuits is arranged so as to oppose the opposing electrode 33 via the liquid crystal 37. With an LC common electrode potential applied to the light-shielding film 25, since it is applied to the opposing electrode 33, DC voltage is not applied to the liquid crystal area therebetween. In this, if the liquid crystal is the TN type, molecules thereof are kept to be twisted 90°; if the liquid crystal is the SH type, the molecules thereof are kept to be vertically oriented. That is, the liquid crystal 37 causes neither ON/OFF switching nor voids according to variation in potential of the light-shielding film 25. Generally, the light-shielding film provided in the region surrounded by the liquid crystal 37 and made of one of the first conductive layer, the second conductive layer, and the third conductive layer which opposes the liquid crystal 37 (that is, not a conductive layer formed for wiring, but one of conductive layers formed for shielding light) should preferably be arranged so as to cause the opposing portion of the liquid crystal 37 to be regularly fixed in black or white so that the liquid crystal 37 does not cause voids and is in high contrast according to distinctions in a normally-black mode and a normally-white mode and distinctions in flame-inversion driving, line-inversion driving, column-inversion driving, dot-inversion driving, and the like, and, for example, either by arranging the potential to be the same as that of the opposing electrode 33 or the like, or by arranging the potential to be the same as that of a predetermined power supply, and concurrently, so as not to cause the liquid crystal 37 to be deteriorated according to application of DC current.

Particularly, in this embodiment, since the substrate 1 made of the semiconductor substrate has, on its reverse surface, the substrate 32 made of glass, ceramics, or the like, which is adhered with an adhesive, the strength can be significantly improved. As a result, when the substrate 32 is adhered to the substrate 1 and is then adhered to the opposing substrate (glass substrate 35), an advantage is produced in that the gaps on the liquid crystal layer are uniformed all over the liquid crystal panel.

The substrate 1 of the liquid crystal panel 30 in each of the embodiments described above with reference to FIGS. 1 to 14 may be additionally provided with various circuits according to the method of driving the pixels, including a sampling circuit for sampling video signals with predetermined timing, a precharging circuit for writing a precharge signal of a predetermined potential with timing preceding a video signal with respect to each data line in order to reduce a load for writing a video signal to the data line, and an inspection circuit for inspecting the liquid crystal apparatus for quality and defects during manufacture and at delivery time.

Components such as a polarizing film, a phase-contrast film, and a polarizer are arranged in a predetermined direction in the outside of the opposed substrate 35 of each of the embodiments described above with reference to FIGS. 1 to 14. These components are provided according to distinctions in, for example, operation modes including the twisted nematic (TN) mode, a vertically aligned (VA) mode, and a polymer dispersed liquid crystal (PDLC) mode, and the normally-white mode and the normally-black mode. Also, in a predetermined region opposing the reflector 13, an RGB color filter with a protection film therefor may be formed on the opposed substrate. Alternatively, color-filter layers may be formed of a material such as a color resist over the reflectors 13 corresponding to the color filters for R, G, and B on the substrate 1. This allows the liquid crystal panel according to each of the embodiments to be applied to color liquid crystal apparatuses, such as color liquid crystal TV sets of a direct-view type and a reflective type. Also, dichroic filters that produce colors R, G, and B may be formed by overlaying interference layers, each having a different refractive ratio, on the opposed substrate 35 and by using interference of light. Using an opposed substrate having the dichroic filter allows realization of a color liquid crystal apparatus capable of presenting displays even more brightly colored.

Description Regarding Electronic equipment Using Liquid-Crystal Panel of Present Invention Hereinbelow, a description will be given of example electronic equipment using the reflective liquid crystal panel of the present invention as a display unit.

Figure 15A:
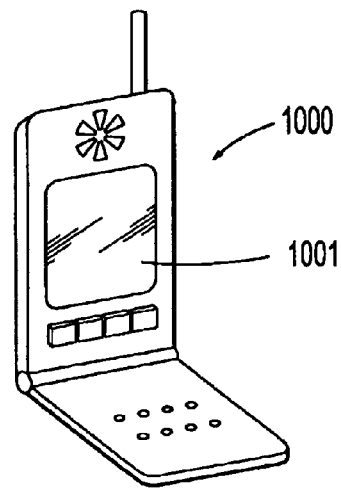
FIGS. 15(a) and 15(b) show a perspective view (FIG. 15(a)) of a portable telephone, a perspective view (FIG. 15(b)) of a TV set of a wrist watch type, and a perspective view (FIG. 15(c)) of a personal computer, each using the reflective liquid crystal panel according to one of the embodiments.

FIG. 15(a) is a perspective view of a portable telephone. A portable telephone 1000 has a liquid crystal display unit 1001 using the reflective liquid crystal panel of the present invention.

Figure 15B:
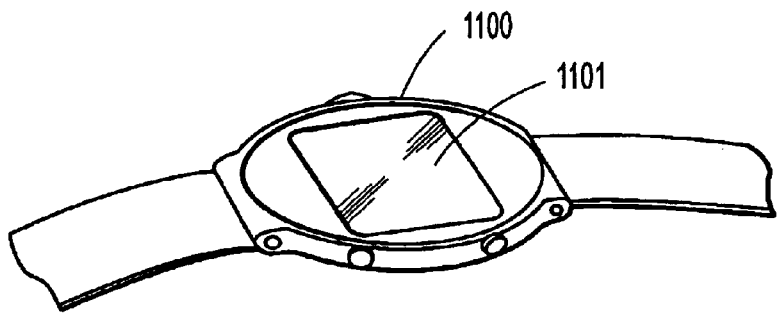

FIG. 15(b) is a perspective view of an electronic equipment of a wrist watch type. A watch 1100 has a liquid crystal display unit 101 using the reflective liquid crystal panel of the present invention. Since the reflective liquid crystal panel has pixels smaller and more accurate than conventional pixels, it can be used to realize TV image displays, and in addition, TV sets of a wrist watch type.

Figure 15C:
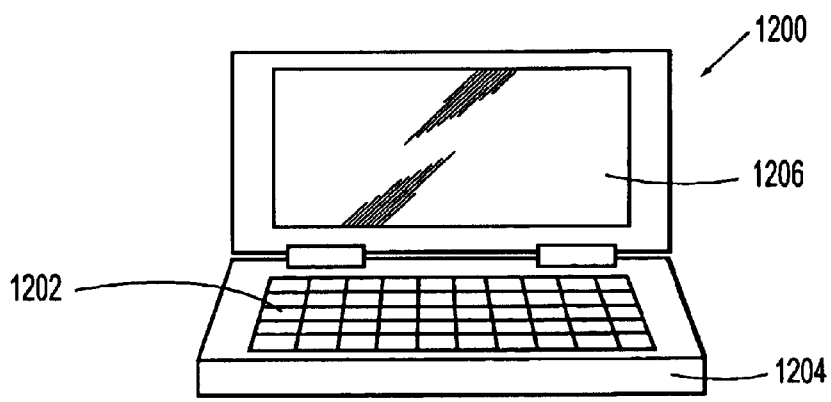

FIG. 15(c) is a perspective view of a portable information-processing apparatus, such as a word processor, a personal computer, or the like. A portable information-processing apparatus 1200 has an input unit 1202 such as a key board, a liquid crystal display unit 1206 including the reflective liquid crystal panel of the present invention and an information-processing-apparatus main unit 1204.

Each of electronic equipment is driven by a battery. A service life of the battery can be increased when the reflective liquid crystal panel that does not include a light-source lamp is used. Also, as the present invention, since peripheral circuits can be provided inside of the liquid crystal panel, the number of components required is significantly decreased, thereby allowing the electronic equipment to be light and small.

In addition to the electronic equipment shown in FIGS. 15(a)–15(c), there are other electronic equipment to which the liquid crystal panel using the liquid crystal panel substrate according to each of the first to fourth embodiments can be applied. The electronic equipment include liquid crystal TV sets, video tape recorders of a view-finder type or a direct-view-monitor type, car navigation systems, pocket-sized electronic notebooks, electronic calculators, wordprocessors, engineering workstations (EWSs), video telephones, POS terminals, and devices with a touch panel.

The present invention is not restricted to the described embodiments, but modifications may be incorporated as required within the spirit and scope of the invention.

What is claimed is:

1. A liquid crystal panel substrate comprising:
a plurality of transistors;
a light-shielding film connected to the transistors;
a plurality of reflectors connected to the light-shielding film;
a concave-convex film formed in a concave-convex condition and overlaid in regions corresponding to the reflectors via interlayer insulation films under the reflectors; and
a first conductive film overlaid via the interlayer insulation films between the concave-convex film and the substrate, and surfaces of the reflectors being formed in a concave-convex condition depending on existence of the concave-convex film and existence or non-existence of the first conductive film, and the existence of the first conductive film forming convex portions of the reflectors and the non-existence of the first conductive film forming concave portions of the reflectors.

2. The liquid crystal panel substrate of claim 1, the light-shielding film shielding light for gaps between the reflectors as viewed in a direction perpendicular to the substrate.

3. The liquid crystal panel substrate of claim 1, the light-shielding film being formed of a second conductive film and comprising wiring formed of the second conductive film.

4. The liquid crystal panel substrate of claim 1, the concave-convex film being formed in the concave-convex condition in a manner that a large number of very small openings are irregularly formed on a planar film.

5. The liquid crystal panel substrate of claim 1, the substrate being made of a semiconductor substrate.

6. The liquid crystal panel substrate of claim 5, the substrate being formed of monocrystal silicon material.

7. The liquid crystal panel substrate of claim 1, the substrate being made of a transparent substrate.

8. The liquid crystal panel substrate of claim 7, the substrate being made of glass.

9. The liquid crystal panel substrate of claim 1, the interlayer insulation films including an SOG (silicon on glass) film.

10. The liquid crystal panel substrate of claim 9, the SOG film being subjected to etchback processing.

11. A liquid crystal panel, comprising:
the liquid crystal substrate of claim 1, liquid crystal being sandwiched between the liquid crystal panel substrate and a transparent opposed substrate.

12. Electronic equipment, comprising:
the liquid crystal panel as stated in claim 11.

13. A manufacturing method for a liquid crystal panel substrate having transistors, a light-shielding film connected to the transistors, and reflectors connected to the transistors, comprising:
forming a concave-convex film in a concave-convex condition and overlaid in regions that correspond to the reflectors via interlayer insulation films under the reflectors on the substrate;
forming the reflectors over interlayer insulation films on the substrate; and
forming a conductive film overlaid via the interlayer insulation films between the concave-convex film and the substrate, and surfaces of the reflectors being forming in a concave-convex condition depending on existence or non-existence of the conductive films and the existence of the conductive film forming convex portions of the reflectors and the non-existence of the conductive film forming concave portions of the reflectors.

14. A display panel substrate, comprising:
multiple line-scanning lines;
multiple column-scanning lines that intersect with the multiple line-scanning lines;
multiple data lines arranged the column-scanning lines;
voltage signal lines that feed voltage signals;
multiple pixel-driving circuits arranged corresponding to cross sections of the line-scanning lines and the column-scanning lines on a substrate, the pixel-driving circuits having pixel electrodes, switching circuits that are conductive when the line-scanning lines are selected and are nonconductive when at least one of the line-scanning lines and the column-scanning lines is not selected, memory circuits that receive data signals from the data lines when the switching circuits are conductive and that preserve the data signals when the switching circuits are nonconductive, pixel drivers that output first voltage signals from the voltage signal lines to the pixel electrodes when the data signals preserved in the memory circuits are at a first level and that output second voltage signals from the voltage signal lines to the pixel electrodes when the data signals preserved in the memory circuits are at a second level, the pixel drivers being connected to reflectors via a light-shielding film, and a concave-convex film overlaid in regions corresponding to the reflectors via interlayer insulation films under the reflectors, and formed of a film identical to the light-shielding film formed in a concave-convex condition; and
a first conductive film being overlaid by the interlayer insulation films between the concave-convex film and the substrate, and surfaces of the reflectors being formed in a concave-convex condition depending on existence of the concave-convex film and existence or non-existence of the first conductive film, and the existence of the first conductive film forming convex portions of the reflectors and the non-existence of the first conductive film forming concave portions of the reflectors.

15. The display panel substrate of claim 14, the light-shielding film being formed of a film identical to that of the concave-convex film, and shielding light for gaps between the reflectors as viewed in a direction perpendicular to the substrate.

16. The display panel substrate of claim 14, the concave-convex film being formed of a second conductive film and comprising wiring formed of the second conductive film.

17. The display panel substrate of claim 14, the concave-convex film being formed in the concave-convex condition in a manner that a large number of very small openings are irregularly formed on a planar film.

* * * * *